(12) United States Patent
Huang et al.

(10) Patent No.: US 12,412,566 B2
(45) Date of Patent: Sep. 9, 2025

(54) LOOKUP-TABLE RECURRENT LANGUAGE MODEL

(71) Applicant: Google LLC, Mountain View, CA (US)

(72) Inventors: Ronny Huang, Mountain View, CA (US); Tara N. Sainath, Jersey City, NJ (US); Trevor Strohman, Mountain View, CA (US); Shankar Kumar, Mountain View, CA (US)

(73) Assignee: Google LLC, Mountain View, CA (US)

( * ) Notice: Subject to any disclaimer, the term of this patent is extended or adjusted under 35 U.S.C. 154(b) by 543 days.

(21) Appl. No.: 17/650,566

(22) Filed: Feb. 10, 2022

(65) Prior Publication Data

US 2022/0310067 A1 Sep. 29, 2022

Related U.S. Application Data

(60) Provisional application No. 63/165,725, filed on Mar. 24, 2021.

(51) Int. Cl.
*G10L 15/16* (2006.01)
*G06F 40/30* (2020.01)
(Continued)

(52) U.S. Cl.
CPC .............. *G10L 15/083* (2013.01); *G06N 3/04* (2013.01); *G10L 15/16* (2013.01); *G10L 15/187* (2013.01);
(Continued)

(58) Field of Classification Search
CPC ..... G10L 15/083; G10L 15/16; G10L 15/187; G10L 15/26; G10L 2015/088;
(Continued)

(56) References Cited

U.S. PATENT DOCUMENTS 10,176,802 B1 * 1/2019 Ladhak ................... G10L 15/16
10,431,210 B1 * 10/2019 Huang ..................... G06N 3/084
(Continued)

FOREIGN PATENT DOCUMENTS

| CA | 3039551 A1 * | 5/2018 | ......... G06F 17/2705 |
| KR | 20210154849 A * | 12/2021 | ............. G06N 3/044 |
| WO | WO-2019245916 A1 * | 12/2019 | ........... G06F 40/263 |

OTHER PUBLICATIONS

Ehsan Variani, David Rybach, Cyril Allauzen, Michael Riley ""Hybrid Autoregressive Transducer (HAT)" (Mar. 12, 2020)" arXiv:2003.07705v1 [eess.AS] Mar. 12, 2020, (Year: 2020) (Year: 2020).*

(Continued)

*Primary Examiner* — Paras D Shah
*Assistant Examiner* — Mulugeta Tuji Dugda
(74) *Attorney, Agent, or Firm* — Honigman LLP; Brett A. Krueger; Grant Griffith (57) ABSTRACT

A computer-implemented method includes receiving audio data that corresponds to an utterance spoken by a user and captured by a user device. The method also includes processing the audio data to determine a candidate transcription that includes a sequence of tokens for the spoken utterance. Tor each token in the sequence of tokens, the method includes determining a token embedding for corresponding token, determining a n-gram token embedding for a previous sequence of n-gram tokens, and concatenating the token embedding and the n-gram token embedding to generate a concatenated output for the corresponding token. The method also includes rescoring the candidate transcription for the spoken utterance by processing the concatenated output generated for each corresponding token in the sequence of tokens.

22 Claims, 5 Drawing Sheets

(51) Int. Cl.
 *G06N 3/04* (2023.01)
 *G10L 15/08* (2006.01)
 *G10L 15/187* (2013.01)
 *G10L 15/26* (2006.01)

(52) U.S. Cl.
 CPC ........ *G10L 15/26* (2013.01); *G10L 2015/088* (2013.01)

(58) Field of Classification Search
 CPC ........ G10L 15/197; G06N 3/04; G06N 3/044; G06N 3/045; G06N 3/0464; G06F 40/295; G06F 40/30; G06F 40/216; G06F 40/237; G06F 40/284; G06F 40/289
 See application file for complete search history.

(56) References Cited

U.S. PATENT DOCUMENTS

| | | | | |
|---|---|---|---|---|
| 11,256,707 | B1* | 2/2022 | Xiong | G06N 3/045 |
| 11,610,586 | B2* | 3/2023 | Qiu | G10L 15/08 |
| 2017/0186432 | A1 | 6/2017 | Aleksic et al. | |
| 2017/0270100 | A1* | 9/2017 | Audhkhasi | G06F 40/289 |
| 2018/0329897 | A1* | 11/2018 | Kalchbrenner | G06F 40/44 |
| 2021/0232753 | A1* | 7/2021 | He | G06F 40/216 |
| 2021/0264220 | A1* | 8/2021 | Wei | G06N 20/10 |
| 2021/0279042 | A1* | 9/2021 | Allamanis | G06N 3/049 |
| 2022/0253502 | A1* | 8/2022 | Alonichau | G06F 40/30 |

OTHER PUBLICATIONS

Ehsan Variani, David Rybach, Cyril Allauzen, Michael Riley ""Hybrid Autoregressive Transducer (HAT)" (Mar. 12, 2020)" arXiv:2003.07705v1 [eess.AS] Mar. 12, 2020, (Year: 2020).*
Ogawa, A., Delcroix, M., Karita, S., & Nakatani, T. (2019). Improved Deep Duel Model for Rescoring N-Best Speech Recognition List Using Backward LSTMLM and Ensemble Encoders. In Interspeech (pp. 3900-3904). (Year: 2019).*
Ronny Huang W et al.: "Lookup-Table Recurrent Language Models for Long Tail Speech Recognition", arxiv.org, Cornell University Library, 201 Olin Library Cornell University Ithaca, Ny 14853, Jun. 7, 2021 (Jun. 7, 2021).
Variani Ehsan et al.: "Hybrid Autoregressive Transducer (HAT)", ICASSP 2020—2020 IEEE International Conference on Acoustics, Speech and Signal Processing (ICASSP), IEEE, May 4, 2020 (May 4, 2020), pp. 6139-6143.
Ofir Press et al.: "Using the Output Embedding to Improve Language Models", Proceedings of the 15th Conference of the European Chapter of the Association for Computational Linguistics: vol. 2, Short Papers, Feb. 21, 2017 (Feb. 21, 2017), pp. 157-163.
May 18, 2022 Written Opinion (WO) of the International Searching Authority (ISA) and International Search Report (ISR) issued in International Application No. PCT/US2022/015956.
Indian Office Action for the related Application No. 202327062921 dated May 6, 2025.

* cited by examiner

LOOKUP-TABLE RECURRENT LANGUAGE MODEL

CROSS REFERENCE TO RELATED APPLICATIONS

This U.S. Patent Application claims priority under 35 U.S.C. § 119(e) to U.S. Provisional Application 63/165,725, filed on Mar. 24, 2021. The disclosure of this prior application is considered part of the disclosure of this application and is hereby incorporated by reference in its entirety.

TECHNICAL FIELD

This disclosure relates to a lookup-table recurrent language model.

BACKGROUND

Automatic speech recognition (ASR) systems have increased in popularity in recent years for assistant enabled devices. Improving the recognition of words infrequently spoken is an ongoing problem for ASR systems. Words that are infrequently spoken are rarely included in acoustic training data and, therefore, are difficult for ASR systems to accurately recognize in speech. In some instances, ASR systems include language models that train on text-only data to improve recognition of infrequently spoken words. However, these language models often include large memory and computational requirements that lead to a decrease in efficiency of ASR systems.

SUMMARY

One aspect of the disclosure provides a computer-implemented method that when executed on data processing hardware causes the data processing hardware to perform operations for performing speech recognition using a lookup-table recurrent language model. The operations include receiving audio data that corresponds to an utterance spoken by a user and captured by a user device. The operations also include processing, using a speech recognizer, the audio data to determine a candidate transcription that includes a sequence of tokens for the spoken utterance. For each token in the sequence of tokens, the operations include determining a token embedding for the corresponding token using a first embedding table, determining a n-gram token embedding for a previous sequence of n-gram tokens using a second embedding table, and concatenating the token embedding and the n-gram token embedding to generate a concatenated output for the corresponding token. The operations also include rescoring, using an external language model, the candidate transcription for the spoken utterance by processing the concatenated output generated for each corresponding token in the sequence of tokens.

Implementations of the disclosure may include one or more of the following optional features. In some implementations, the external language model includes a recurrent neural network language model. The external language model may integrate with the speech recognizer by Hybrid Autoregressive Transducer (HAT) factorizing the speech recognizer. In some examples, the speech recognizer includes a conformer audio encoder and a recurrent neural network-transducer decoder. In other examples, the speech recognizer includes a transformer audio encoder and a recurrent neural network-transducer decoder. Optionally, each token in the sequence of tokens of the candidate transcription may represent a word in the candidate transcription. Each token in the sequence of tokens of the candidate transcription may represent a wordpiece in the candidate transcription In some implementations, each token in the sequence of tokens of the candidate transcription represents an n-gram, phoneme, or grapheme in the candidate transcription. In some examples, the first and second embedding tables are stored sparsely on memory hardware in communication with the data processing hardware. Determining the token embedding for the corresponding token may include retrieving the token embedding from the first embedding table via a look-up without requiring access to any graphics processing units and/or tensor processing units. Optionally, the data processing hardware may reside on the user device.

Another aspect of the disclosure provides a system that includes data processing hardware and memory hardware storing instructions that when executed on the data processing hardware causes the data processing hardware to perform operations. The operations include receiving audio data that corresponds to an utterance spoken by a user and captured by a user device. The operations also include processing, using a speech recognizer, the audio data to determine a candidate transcription that includes a sequence of tokens for the spoken utterance. For each token in the sequence of tokens, the operations include determining a token embedding for the corresponding token using a first embedding table, determining a n-gram token embedding for a previous sequence of n-gram tokens using a second embedding table, and concatenating the token embedding and the n-gram token embedding to generate a concatenated output for the corresponding token. The operations also include rescoring, using an external language model, the candidate transcription for the spoken utterance by processing the concatenated output generated for each corresponding token in the sequence of tokens.

Implementations of the disclosure may include one or more of the following optional features. In some implementations, the external language model includes a recurrent neural network language model. The external language model may integrate with the speech recognizer by Hybrid Autoregressive Transducer (HAT) factorizing the speech recognizer. In some examples, the speech recognizer includes a conformer audio encoder and a recurrent neural network-transducer decoder. In other examples, the speech recognizer includes a transformer audio encoder and a recurrent neural network-transducer decoder. Optionally, each token in the sequence of tokens of the candidate transcription may represent a word in the candidate transcription. Each token in the sequence of tokens of the candidate transcription may represent a wordpiece in the candidate transcription In some implementations, each token in the sequence of tokens of the candidate transcription represents an n-gram, phoneme, or grapheme in the candidate transcription. In some examples, the first and second embedding tables are stored sparsely on memory hardware in communication with the data processing hardware. Determining the token embedding for the corresponding token may include retrieving the token embedding from the first embedding table via a look-up without requiring access to any graphics processing units and/or tensor processing units. Optionally, the data processing hardware may reside on the user device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Improving the recognition of rare word or sequences is an ongoing problem in speech recognition systems that mis-recognize many input text utterances that appear with zero or low frequency in acoustic data. In particular, proper nouns such as street names, cities, etc. are rarely spoken (i.e., long tail content) and often not included in acoustic training data making the long tail content difficult to recognize for speech recognition systems. In some implementations, speech recognition systems integrate language models that train with text-only data that includes rarely spoken long tail content. That is, language models may be trained on a corpus of text-only data that includes long tail content that is absent in acoustic data and can bias speech recognition systems toward correctly decoding the long tail content.

In order to accurately model the vast amounts of long tail content, language models need to increase the size of an embedding vocabulary. The embedding vocabulary represents an embedding identification associated with each token of a token vocabulary (i.e., words, wordpieces, n-grams, etc.) of the language model. In most instances, increasing the embedding vocabulary includes increasing the token vocabulary which requires large amounts of memory and computational resources that burden the speech recognition systems. Further, downstream tasks of the speech recognition system are also effected by an increased token vocabulary.

Implementations herein are directed towards a recurrent language model that increases the embedding vocabulary while keeping the size of the token vocabulary constant. That is, the embedding vocabulary increases independently of the token vocabulary allowing for more accurate modeling without burdening computational resources of the speech recognition system. In particular, the recurrent language model includes a first embedding table that generates a token embedding for a current token (e.g., word, wordpiece, n-gram, etc.) of a token sequence and a second embedding table that generates a sequence embedding for the previous tokens of the token sequence (e.g., n-gram sequence). Here, the token embedding provides the speech recognition system a likelihood of transcribing a particular word and the sequence embedding provides a likelihood of transcribing a particular word based on the particular sequence of previously transcribed words. Thus, the second embedding table increases the embedding vocabulary of the language model while the token vocabulary remains constant.

Scaling up the embedding vocabulary of the language model with the second embedding table requires no additional operations (e.g., computational resources) of the speech recognition system because the size of the embedding vocabulary has no effect on the number of embedding lookups or operations at each output step. Therefore, the only practical constraint for the size of the embedding vocabulary is the memory capacity. In some examples, the embedding tables are accessed sparsely and are not required to be stored on graphics processing units (GPU) and/or tensor processing units (TPU). Rather, the embedding tables may be stored on computer processing units (CPU) memory, disc, or other storage that includes capacities far greater than GPU and/or TPU memory.

Figure 1:
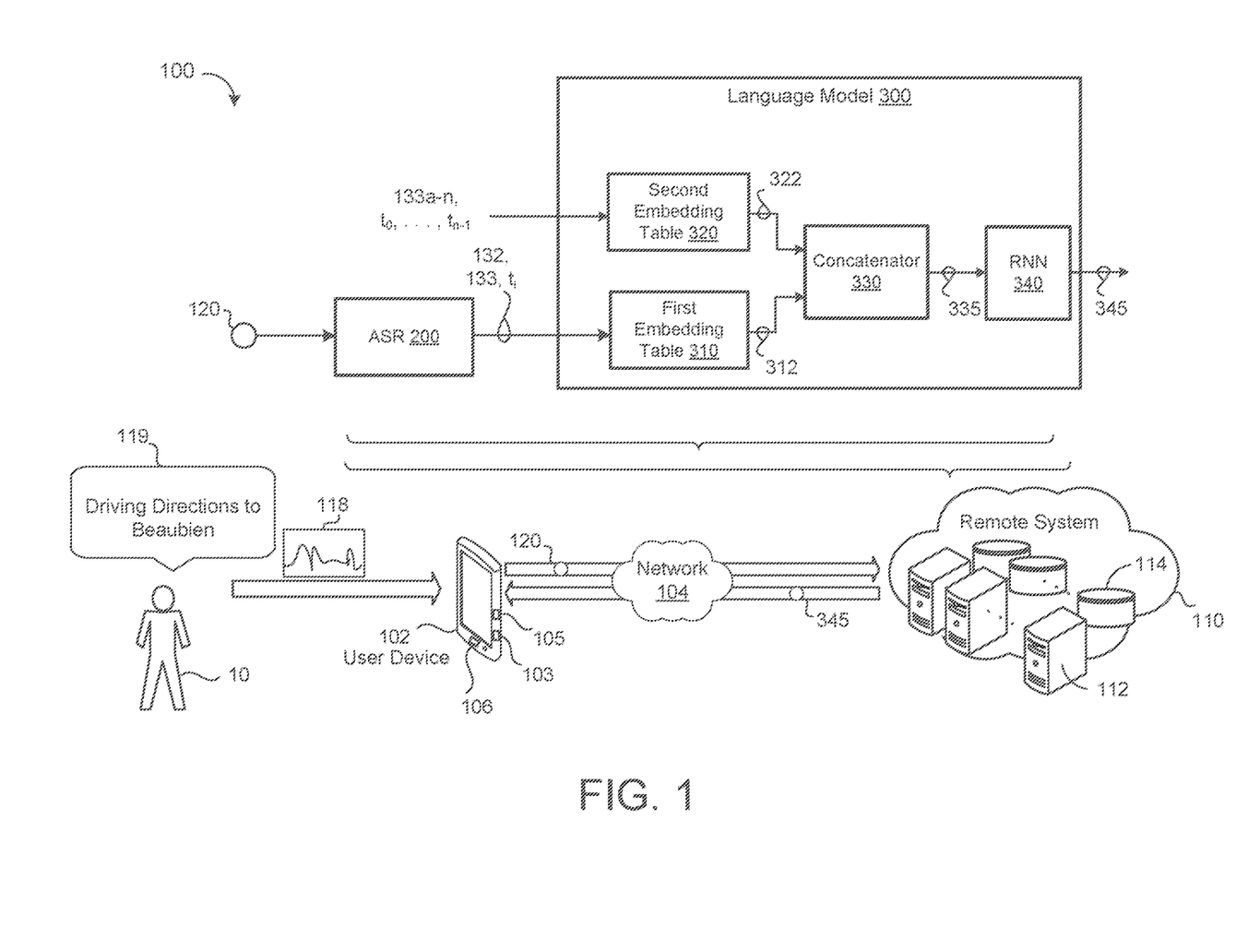
FIG. 1 is an example system for integrating a speech recognition model with a language model having an n-gram embedding lookup table.

Referring now to FIG. 1, in some implementations, an example speech recognition system 100 includes a user device 102 associated with a respective user 10. The user device 102 may be in communication with a remote system 110 via a network 104. The user device 102 may correspond to a computing device, such as a mobile phone, computer, wearable device, smart appliance, audio infotainment system, smart speaker, etc. and is equipped with data processing hardware 103 and memory hardware 105. The remote system 110 may be a single computer, multiple computers, or a distributed system (e.g., a cloud environment) having scalable/elastic computing resources 112 (e.g., data processing hardware) and/or storage resources 114 (e.g., memory hardware).

The user device 102 may receive streaming audio 118 captured by the one or more microphones 106 of the user device 102 that corresponds to an utterance 119 spoken by the user 10 and extract acoustic features from the streaming audio 118 to generate audio data 120 corresponding to the utterance 119. The acoustic features may include Mel-frequency cepstral coefficients (MFCCs) or filter bank energies computed over windows of the audio data 120 corresponding to the utterance 119. The user device 102 communicates the audio data 120 corresponding to the utterance 119 to a speech recognizer 200 (also referred to herein as automated speech recognizer (ASR) model 200). The ASR model 200 may reside and execute on the user device 102. In other implementations, the ASR model 200 resides and executes on the remote system 110.

Figure 2:
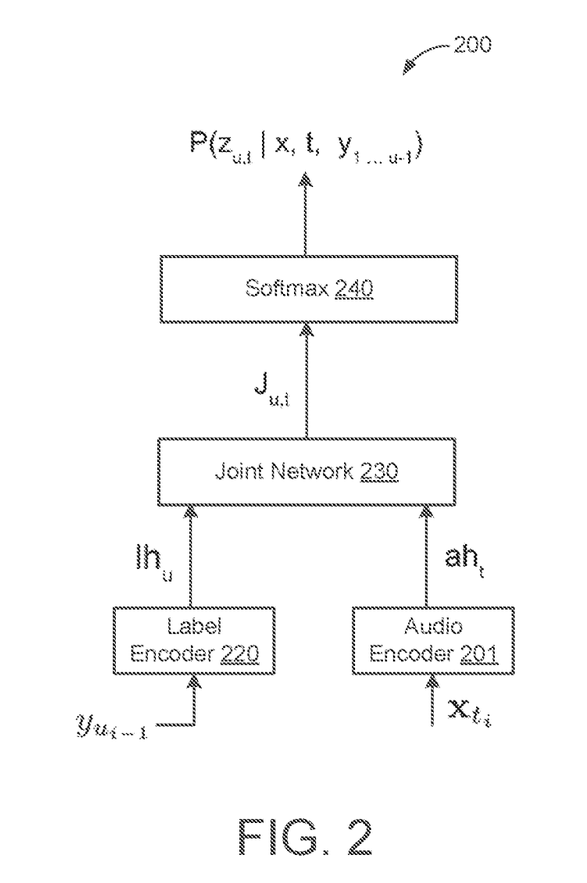
FIG. 2 is an example speech recognition model.

With reference to FIG. 2, the ASR model 200 may provide end-to-end (E2E) speech recognition by integrating acoustic, pronunciation, and language models into a single neural network, and does not require a lexicon or a separate text normalization component. Various structures and optimization mechanisms can provide increased accuracy and reduced model training time. The ASR model 200 may include a Conformer-Transducer model architecture, which adheres to latency constraints associated with interactive applications. The ASR model 200 provides a small computational footprint and utilizes less memory requirements than conventional ASR architectures, making the ASR model architecture suitable for performing speech recognition entirely on the user device 102 (e.g., no communication with a remote system 110 is required). The ASR model 200 includes an audio encoder 201, a label encoder 220, and a joint network 230. The audio encoder 201, which is roughly analogous to an acoustic mode) (AM) in a traditional ASR system, includes a neural network having a plurality of conformer layers. For instance, the audio encoder 201 reads a sequence of d-dimensional feature vectors (e.g., acoustic frames in streaming audio 118 (FIG. 1) $x=(x_1, x_2, \ldots, x_T)$, where $x_t \in \mathbb{R}_d$, and produces at each time step a higher-order feature representation. This higher-order feature representation is denoted as $ah_1, \ldots, ah_T$. Optionally, the audio encoder 201 may include transformer layers in lieu of conformer layers. Similarly, the label encoder 220 may also include a neural network of transformer layers or a look-up table embedding model, which, like a language model (LM), processes the sequence of non-blank symbols output by a final Soft max layer 240 so far, $y_0, \ldots, y_{m-1}$, into a dense representation $lh_n$ that encodes predicted label history.

Finally, the representations produced by the audio and label encoders 201, 220 are combined by the joint network 230 using a dense layer $J_{u,t}$. The joint network 230 then predicts $P(z_{u,t}|x, t, y_1, \ldots, y_{u-1})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels (also referred to as "speech units") each representing a grapheme (e.g., symbol/character) or a wordpiece or word in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $z_{u,t}$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription.

The Softmax layer 240 may employ any technique to select the output label/symbol with the highest probability in the distribution as the next output symbol predicted by the ASR model 200 at the corresponding output step. In this manner, the ASR model 200 does not make a conditional independence assumption, rather the prediction of each symbol is conditioned not only on the acoustics but also on the sequence of labels output so far.

Referring back to FIG. 1, the ASR model 200 is configured to process the audio data 120 to determine a candidate transcription 132 for the spoken utterance 119. Here, the candidate transcription includes a sequence of tokens 133, 133a-n with each token 133 representing a portion of the candidate transcription 132 for the utterance 119. That is, each token 133 in the sequence of tokens 133 may represent a potential word, wordpiece, n-gram, phoneme, and/or grapheme in the candidate transcription 132. For example, the ASR model 200 generates a candidate transcription 132 of "driving directions to bourbon" for the spoken utterance 119 of "driving directions to Beaubien." In this example, each token 133 in the sequence of tokens 133 for the candidate transcription 132 may represent a single word. Accordingly, the sequence of tokens 133 includes four (4) tokens 133 each representing a single word in the candidate transcription 132 (e.g., "driving directions to bourbon"). Notably, the fourth token 133d representing the term "bourbon" is misrecognized by the ASR model 200 for the correct term "Beaubien" in the spoken utterance 119.

Moreover, the ASR model 200 may generate each token 133 in the sequence of tokens 133 as a corresponding probability distribution over possible candidate tokens. For example, for the fourth token 133 in the sequence of tokens 133, the ASR model 200 may generate the tokens "bourbon" and "Beaubien" as corresponding possible tokens each having a corresponding probability or likelihood indicating a confidence that ASR model 200 recognized the possible token for the respective fourth token 133. Here, the first and second candidate token are phonetically similar, however, the ASR model may favor the first candidate token associated with the term "bourbon" over the second candidate token associated with the term "Beaubien" since "Beaubien" is a proper noun (e.g., rare word or long tail content) likely not included in the acoustic training data of the ASR model 200. That is, because "Beaubien" was not included in the acoustic training data, or only included in a few instances of the acoustic training data, the ASR model 200 may not correctly recognize this particular term in the utterance 119. Stated differently, the ASR model 200 may be configured to output a higher probability/likelihood score for the first candidate token (e.g., bourbon) than for the second candidate token (e.g., Beaubien). Thus, the ASR model outputs fourth token 133 in the sequence of tokens 133 as "bourbon" because of the higher probability/likelihood score. While the example describes only two candidate tokens in the probability distribution over possible candidate tokens for simplicity, the number of possible candidate tokens in the probability distribution can be any number greater than two. In some examples, each token 133 in the sequence of tokens 133 is represented by an n-best list of possible candidate tokens 133 associated with a ranked list of the n possible candidate tokens 133 having the highest probability/likelihood scores. Each candidate token 133 may be referred to as a speech recognition hypothesis. In additional examples, each token 133 in the sequence of tokens 133 is represented by the possible candidate token 133 having the highest probability/likelihood score in the probability distribution over possible candidate tokens 133.

The ASR model 200 communicates the candidate transcription 132 that, includes the sequence of tokens 133 to a language model (i.e., recurrent language model) 300. The language model 300 may reside on the memory hardware 105 of the user device 102, or optionally, the storage resources 114 of the remote system 110 or some combination thereof. The language model 300 is configured to determine the likelihood of outputting each token 133 in the sequence of candidate tokens 133. That is, the language model 300 rescores the candidate transcription 132 output by the ASR model 200 by determining which candidate token 133 among possible candidate tokens 133 for each token 133 in the sequence of tokens 133 is most likely to correctly represent the corresponding token 133 in the candidate transcription 132 of the spoken utterance 119. The language model 300 may assist in biasing speech recognition hypotheses output by the ASR model 200 toward rare words, such as proper nouns or long tail content, which were rarely included, or not included, in training audio data used to train the ASR model 200. In the example above, the language model 300 may bias speech recognition by boosting the probability/likelihood score for the candidate token 133 associated with the word "Beaubien" in the probability distribution over possible candidate tokens 133 for the fourth token 133 in the sequence of tokens 133. Here, the boosted probability/likelihood score for the candidate token 133 associated with the word "Beaubien" may now be higher than the probability/likelihood score for the candidate token "bourbon", thereby resulting in a rescored transcription 345 to now correctly recognize the word "Beaubien" from the spoken utterance 119.

The language model 300 may include a recurrent neural network (RNN) language model. More specifically, the language model 300 may include a lookup-table language model configured to scale up the size of the RNN language model by increasing a number of rows in an embedding table, but with only a minimal increase in floating point operations. That is, the lookup-table allows embeddings to be sparsely stored on the memory hardware (e.g. CPU memory or disc) and retrieved from the table via a look up such that the size of the table adds no additional operations to each forward pass alleviating the need for storage on limited/constrained GPU/TPU memory.

The language model 300 includes a first embedding table 310, a second embedding table 320, a concatenator 330, and a recurrent neural network (RNN) 340. In some examples, the language model 300 is trained on text-only data that includes rarely spoken words (i.e., long tail content) to bias candidate tokens of the ASK model 200 to correctly transcribe long tail content.

The first embedding table 310 is configured to generate a token embedding 312 for a current token 133, $t_i$ in the sequence of tokens 133. Here, $t_i$ denotes the current token 133 in the sequence of tokens 133. The first embedding table 310 determines a respective token embedding 312 for each token 133 independent from the rest of the tokens 133 in the sequence of tokens 133. On the other hand, the second embedding table 320 includes an n-gram embedding table that receives a previous n-gram token sequence 133, $t_0, \ldots, t_{n-1}$ at the current output step (e.g. time step) and generates a respective n-gram token embedding 322. The previous n-gram token sequence (e.g., $t_0, \ldots, t_{n-1}$) provides context information about the previously generated tokens 133 at each time step. The previous n-gram token sequence $t_0, \ldots, t_{n-1}$ grows exponentially with n at each time step. Thus, the n-gram token embedding 322 at each output steps assists with short-range dependencies such as spelling out rare words, and thereby improves the modeling of long tail tokens (e.g., words) in subword models.

At each time step, the concatenator 330 concatenates the token embedding 312 and the n-gram token embedding 322 into a concatenated output 335. The RNN 340 receives the concatenated output 335 and ultimately rescores the candidate transcription 132 output by the ASR model 200 using the concatenated output 335 to generate the rescored transcription (e.g., final transcription) 345. Moreover, the language model 300 may provide the rescored transcription 345 to the user device 102 via the network 104. The user device 102 may visually display the rescored transcription 345 on a display of the user device 102 or audibly present the rescored transcription 345 by one or more speakers of the user device 102. In other examples, the rescored transcription 345 may be a query instructing the user device 102 to perform an action.

At a single output step in the example shown, the second embedding table 320 may generate the n-gram token embedding 322 to represent the entire sequence of three previous n-gram tokens (e.g., "driving directions to") from the current token 133 (e.g., "bourbon) represented by the respective token embedding 312 looked-up by the first embedding table 310. Thereafter, the concatenator 330 may concatenate the n-gram token embedding 322 and the respective token embedding 312 to generate the concatenated output 335 (e.g., "driving directions to bourbon"). The RNN 340 rescores the candidate transcription 132 by processing the concatenated output 335. For example, the RNN 340 may rescore the candidate transcription 132 (e.g., driving directions to bourbon) such that the RNN 340 boosts the likelihood/probability score of "Beaubien" to now have a higher likelihood/probability score for the fourth token 133$d$ than "bourbon." The RNN 340 boosts the likelihood/probability score of "Beaubien" based, in part, on the determination that "bourbon" is not likely the correct token 133 with the current context information (e.g., previous n-gram token sequence $t_0, \ldots, t_{n-1}$). Accordingly, the RNN 340 generates the restored transcription 345 (e.g., driving directions to Beaubien). Notably, the fourth token 133 is now correctly recognized in the rescored transcription 345 even though the fourth token 133 was misrecognized in the candidate transcription 132.

Figure 3:
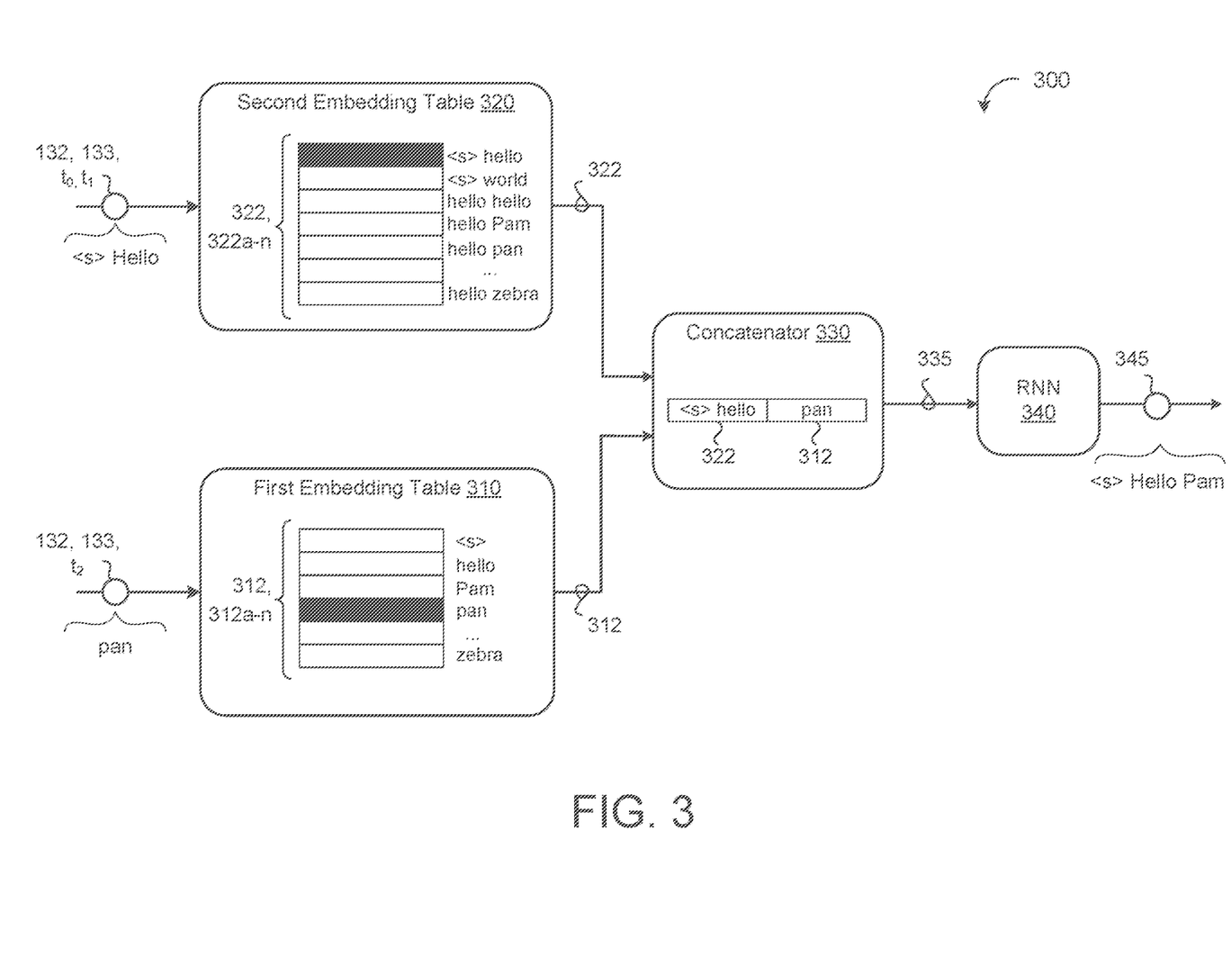
FIG. 3 is a schematic view of an example language model of FIG. 1.

FIG. 3 illustrates a schematic view of the recurrent language model 300 of FIG. 1. The first embedding table 310 includes a plurality of token embeddings 312, 312$a$-$n$ and the second embedding table 320 includes a plurality of n-gram token embeddings 322, 322$a$-$n$. The first embedding table 310 is represented by a U×E matrix where E represents embedding dimension (i.e., embedding length) and U represents the number of token embeddings 322 in the first embedding table 310. Generally, the number of embeddings is equal to the number V of unique tokens (e.g., number of word, wordpieces, n-grams, etc.) That is, the first embedding table 310 stores a respective token embedding 312 for each possible token 133 (e.g., word, wordpiece, etc.). For instance, when the tokens 133 include wordpieces, the recurrent language model 300 may include a 4,096-wordpiece model having two LSTM layers with 512-width and the dimensionality E of the token embedding 312 may be equal to 96. The n-gram token embeddings 322 may each include a dimensionality of 2,048 when n is set to four (4). The second embedding table (e.g., n-gram embedding table) 320 may assign each previous n-gram token sequence (e.g., $t_0, \ldots, t_{n-1}$) an embedding n-gram token embedding (e.g., embedding identifier; 322 via a modular hash as follows.

$$ngram2id(t_0, \ldots, t_{n-1}) = \left(\sum_{i=0}^{n-1} t_i V^i\right) \bmod U \forall t_i \in [0, V) \quad (1)$$

Notably, modular hashing necessitates collisions such that arbitrarily different n-gram embeddings will be hashed to the same n-gram token embedding 322. However, collisions reduce and performance improves by increasing the number of unique tokens V.

In the example shown, the first and second embedding tables 310, 320 receive a sequence of tokens 133 for a candidate transcription 132 corresponding to a spoken utterance 119 "Hello Pam". Notably, the candidate transcription 132 misrecognizes the correct term "Pam" with the term "pan." Here, the first embedding table 310 receives a current token 133 in the candidate transcription 132 corresponding to a third token 133$c$ in the sequence of tokens 133 (e.g., $t_2$). The first embedding table 310 determines a token embedding 312 from the plurality of token embeddings 312 for the third token 133$c$ independent from the rest of the sequence of tokens 133. In this example, the first embedding table 310 determines "pan" as the third token 133c (denoted by the black box) because "pan" may have a 0.8 likelihood/probability score while "Pam" has a 0.2 likelihood/probability score.

The second embedding table 320 receives the previous n-gram token sequence 133 in the candidate transcription 132. Here, the previous n-gram token sequence 133 includes "<s> Hello" (e.g., $t_0$, $t_1$) where <s> denotes a token 133 for the start of a sentence. The second embedding table 320 determines a n-gram token embedding 322 of "<s> Hello" (denoted by the black box) based on the previous n-gram token sequence 133.

The concatenator 330 concatenates the token embedding 312, output from the first embedding table 310 for the current token "pan", and the n-gram token embedding 322 for "s> Hello", and provides the concatenated output 335 (e.g., "<s> Hello pan") to an RNN cell of the RNN 340. Notably, the concatenated output 335 causes the RNN 340 to increase dense parameters in order to process the concatenated output 335, however the scaling is linear rather than quadratic since the RNN output dimensionality remains fixed. The contextual information from the n-gram token embedding 322 is not only useful as an input to the RNN 340, but is also useful at intermediate layers such that intermediate layers/cells receive context information via hidden state specific to that layer. Accordingly, the RNN 340, may inject the concatenated output 335 to the input activations of every layer in the RNN, drawing each from an embedding table specific to that layer.

Continuing with the above example, the RNN 340 rescores the candidate transcription 132 by processing the concatenated output 335. That is, the RNN 340 may boost the probability of the term "Pam" based on the context information (e.g., previous n-gram token sequence 133) included in the concatenated output 335. Accordingly, the RNN 340 may adjust the likelihood/probability score of "pan" to 0.4 and the likelihood/probability score of "Pam" to 0.6. As such, the RNN generates the rescored transcription to include "Pam" as the third token 133c and correctly recognize the spoken utterance 119.

The n-gram embedding table 320 may effectively scale up to nearly a billion parameters. The recurrent language model 300 may be trained on a 3-billion text-only sentence corpus. The language model 300 may be further preprocessed with misspelling removal against a whitelist of one million common words, and with log(n) scaling of sentence frequencies to ensure representation on the tail.

The recurrent language model 300 may integrate with the end-to-end ASR model 200 by first obtaining an effective likelihood by separating out log-posterior from an internal language model score of the ASR model 200 via Hybrid Autoregressive Transducer (HAT) factorization as follows.

$$\log p(y|x) \approx \log p(y|x) - \lambda_2 \log p_{ILM}(y) \qquad (2)$$

Thereafter, the language model log-posterior score is added as follows $$y^* = \underset{y}{\mathrm{argmax}} [\log p(x|y) + \lambda_1 p_{LM}(y)] \qquad (3)$$
$$= \underset{y}{\mathrm{argmax}} \left[ \begin{array}{c} \log p(y|x) - \lambda_2 \log p_{ILM}(y) + \\ \lambda_1 p_{LM}(y) + \lambda_1 p_{LM}(y) \end{array} \right]$$

The RNN-T decoder (e.g., prediction and joint networks 220, 230 (FIG. 2)) may be HAT factorized during training.

Figure 4:
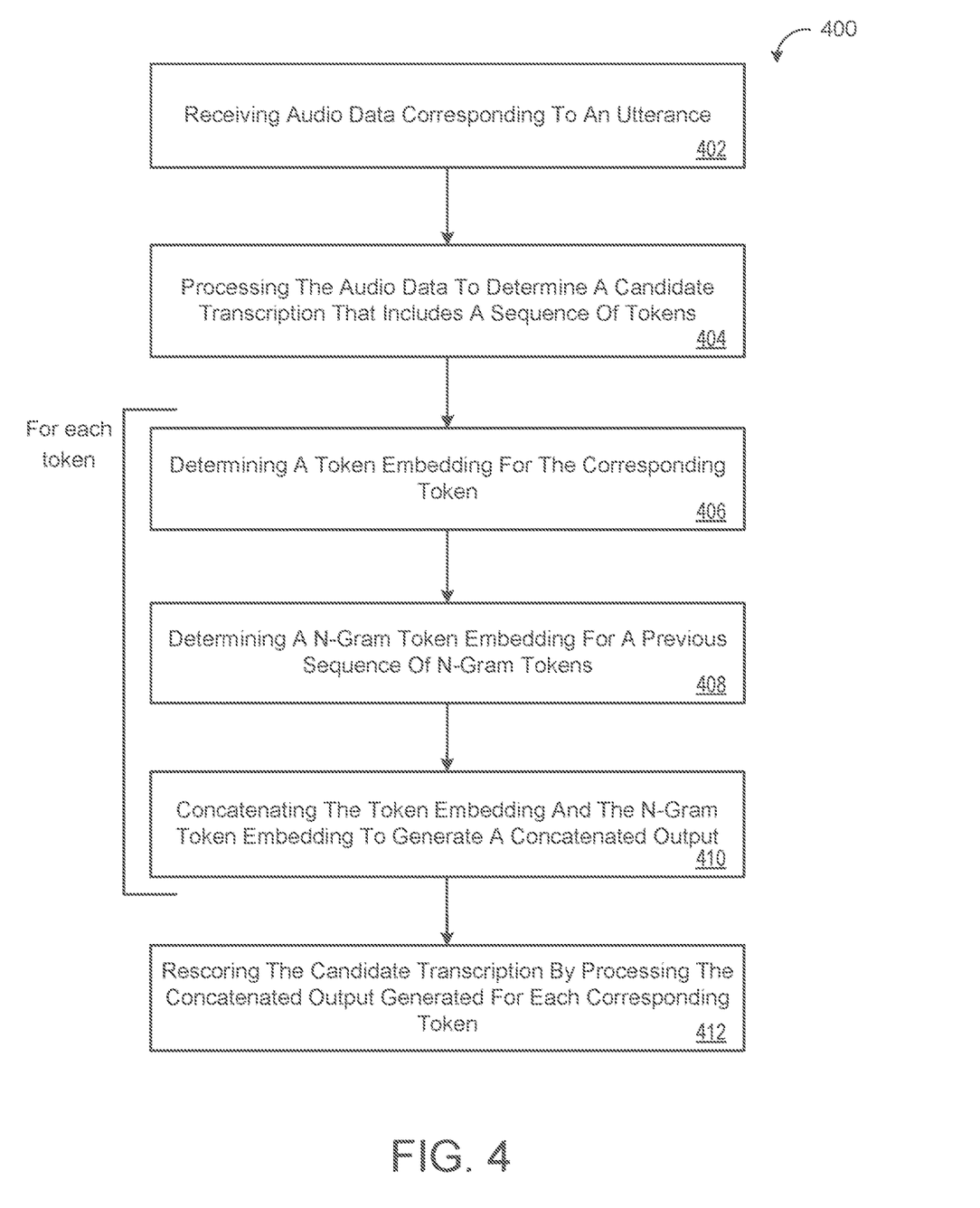
FIG. 4 is an example arrangement of operations for a method of performing speech recognition using a lookup-table recurrent language model.

FIG. 4 is a flowchart of an exemplary arrangement of operation for a method 400 of performing speech recognition using a lookup-table recurrent language model. At operation 402, the method 400 includes receiving audio data 120 that corresponds to an utterance 119 spoken by a user 10 and captured by user device 102. At operation 404, the method 400 includes processing the audio data 120 to determine a candidate transcription 132 for the utterance 119 using a speech recognizer 200. Here, the candidate transcription 132 includes a sequence of tokens 133, 133a-n. For each token 133 in the sequence of tokens 133, the method 400 performs operations 406-410. At operation 406, the method 400 includes determining a token embedding 312 for the corresponding token 133 using a first embedding table 310. At operation 408, the method 400 includes determining a n-gram token embedding 322 for a previous n-gram token sequence 133, $t_0$, . . . , $t_{n-1}$ using a second embedding table 320. At operation 410, the method 400 includes concatenating the token embedding 312 and the n-gram token embedding 322 to generate a concatenated output 335 for the corresponding token 133 At operation 412, the method 400 includes rescoring, using an external language model (e.g., RNN) 340, the candidate transcription 132 for the spoken utterance 119 by processing the concatenated output 335 generated for each corresponding token 133 in the sequence of tokens 133.

Figure 5:
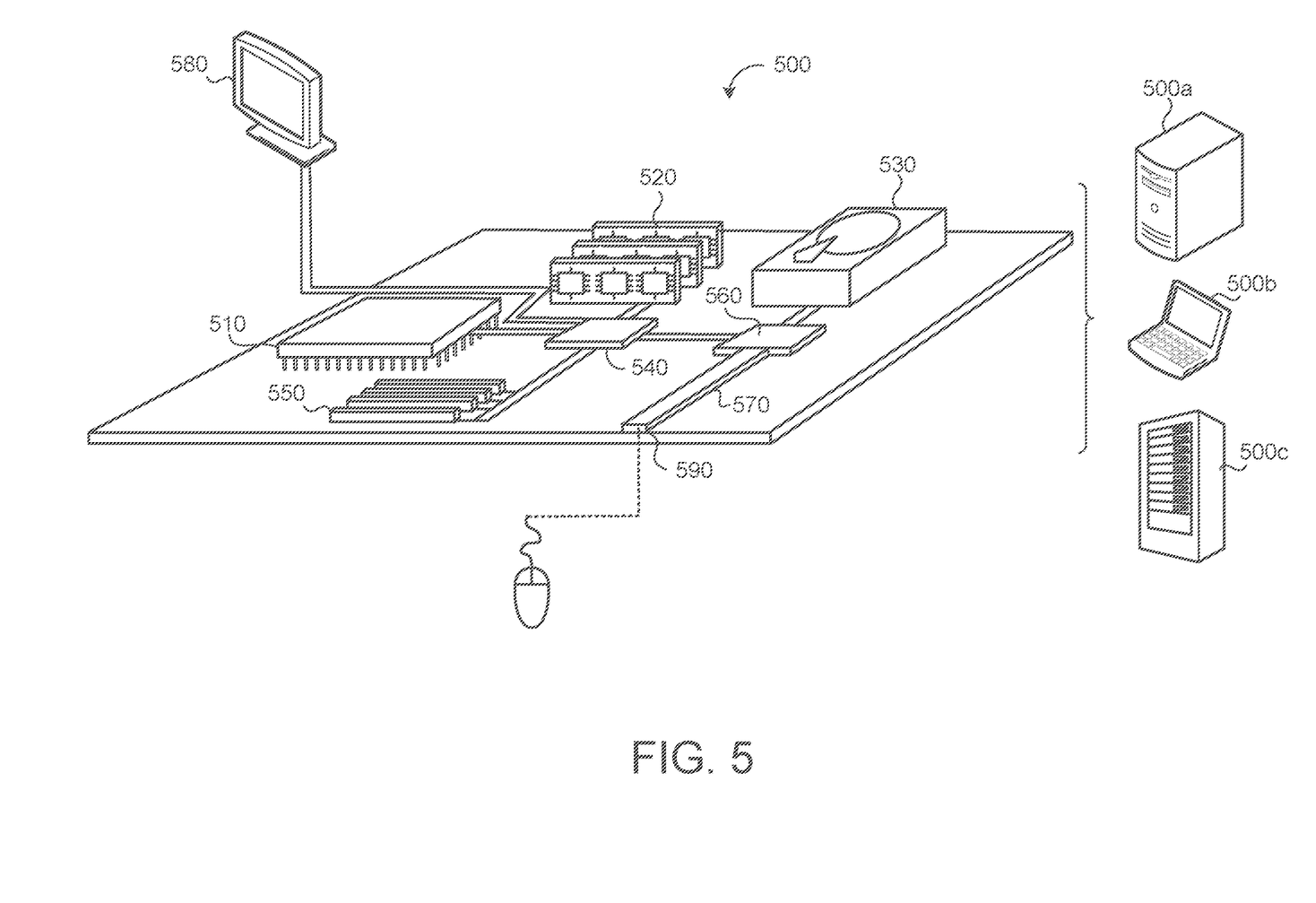
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device. Of a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing, device to perform a task. In some examples, a software application may be referred to as an "application," an "app." or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well, for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations, the operations comprising:
    receiving audio data corresponding to an utterance spoken by a user and captured by a user device;
    processing, using a speech recognizer, the audio data to determine a candidate transcription for the spoken utterance, the candidate transcription comprises a sequence of tokens;
    for each corresponding token in the sequence of tokens subsequent to an initial token in the sequence of tokens:
        determining, using a first embedding table, a token embedding for the corresponding token, the token embedding determined independent from each token in the sequence of tokens that precedes the corresponding token in the sequence of tokens;
        determining, using a second embedding table, a n-gram token embedding for a previous sequence of n-gram tokens, based on each token in the sequence of tokens that precedes the corresponding token in the sequence of tokens; and
        concatenating the token embedding and the n-gram token embedding to generate a concatenated output for the corresponding token; and
    rescoring, using an external language model, the candidate transcription for the spoken utterance by processing the concatenated output generated for each corresponding token in the sequence of tokens.

2. The method of claim 1, wherein the external language model comprises a recurrent neural network language model.

3. The method of claim 1, wherein the external language model integrates with the speech recognizer by Hybrid Autoregressive Transducer (HAT) factorizing the speech recognizer.

4. The method of claim 1, wherein the speech recognizer comprises a conformer audio encoder and a recurrent neural network-transducer decoder.

5. The method of claim 1, wherein the speech recognizer comprises a transformer audio encoder and a recurrent neural network-transducer decoder.

6. The method of claim 1, wherein each token in the sequence of tokens of the candidate transcription represents a word in the candidate transcription.

7. The method of claim 1, wherein each token in the sequence of tokens of the candidate transcription represents a wordpiece in the candidate transcription.

8. The method of claim 1, wherein each token in the sequence of tokens of the candidate transcription represents a n-gram, phoneme, or grapheme in the candidate transcription.

9. The method of claim 1, wherein the first and second embedding tables are stored sparsely on memory hardware in communication with the data processing hardware.

10. The method of claim 1, wherein determining the token embedding for the corresponding token comprises retrieving the token embedding from the first embedding table via a look-up without requiring access to any graphics processing units and/or tensor processing units.

11. The method of claim 1, wherein the data processing hardware resides on the user device.

12. A system comprising:
    data processing hardware; and
    memory hardware in communication with the data processing hardware, the memory hardware storing instructions that when executed by the data processing hardware cause the data processing hardware to perform operations comprising:
        receiving audio data corresponding to an utterance spoken by a user and captured by a user device;
        processing, using a speech recognizer, the audio data to determine a candidate transcription for the spoken utterance, the candidate transcription comprises a sequence of tokens;
        for each corresponding token in the sequence of tokens subsequent to an initial token in the sequence of tokens:
            determining, using a first embedding table, a token embedding for the corresponding token, the token embedding determined independent from each token in the sequence of tokens that precedes the corresponding token in the sequence of tokens;
            determining, using a second embedding table, a n-gram token embedding for a previous sequence of n-gram tokens based on each token in the sequence of tokens that precedes the corresponding token in the sequence of tokens; and
            concatenating the token embedding and the n-gram token embedding to generate a concatenated output for the corresponding token; and
        rescoring, using an external language model, the candidate transcription for the spoken utterance by processing the concatenated output generated for each corresponding token in the sequence of tokens.

13. The system of claim 12, wherein the external language model comprises a recurrent neural network language model.

14. The system of claim 12, wherein the external language model integrates with the speech recognizer by Hybrid Autoregressive Transducer (HAT) factorizing the speech recognizer.

15. The system of claim 12, wherein the speech recognizer comprises a conformer audio encoder and a recurrent neural network-transducer decoder.

16. The system of claim 12, wherein the speech recognizer comprises a transformer audio encoder and a recurrent neural network-transducer decoder.

17. The system of claim 12, wherein each token in the sequence of tokens of the candidate transcription represents a word in the candidate transcription.

18. The system of claim 12, wherein each token in the sequence of tokens of the candidate transcription represents a wordpiece in the candidate transcription.

19. The system of claim 12, wherein each token in the sequence of tokens of the candidate transcription represents a n-gram, phoneme, or grapheme in the candidate transcription.

20. The system of claim 12, wherein the first and second embedding tables are stored sparsely on memory hardware in communication with the data processing hardware.

21. The system of claim 12, wherein determining the token embedding for the corresponding token comprises retrieving the token embedding from the first embedding table via a look-up without requiring access to any graphics processing units and/or tensor processing units.

22. The system of claim 12, wherein the data processing hardware resides on the user device.

* * * * *